(12) United States Patent
Ding et al.

(10) Patent No.: US 9,307,478 B2
(45) Date of Patent: Apr. 5, 2016

(54) METHOD AND SYSTEM FOR CONTROLLING ACCESS OF TERMINAL DEVICE TO WIRELESS NETWORK

(71) Applicant: Huawei Device Co., Ltd., Shenzhen, Guangdong (CN)

(72) Inventors: Zhiming Ding, Shenzhen (CN); Ping Fang, Shenzhen (CN); Yu Zhu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 310 days.

(21) Appl. No.: 13/722,116

(22) Filed: Dec. 20, 2012

(65) Prior Publication Data

US 2014/0036703 A1 Feb. 6, 2014

Related U.S. Application Data

(63) Continuation of application No. PCT/CN2012/079537, filed on Aug. 1, 2012.

(51) Int. Cl.
| | |
|---|---|
| H04L 12/26 | (2006.01) |
| H04W 24/00 | (2009.01) |
| H04W 48/04 | (2009.01) |
| H04W 12/06 | (2009.01) |
| H04W 84/12 | (2009.01) |

(52) U.S. Cl.
CPC .............. *H04W 48/04* (2013.01); *H04W 12/06* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,484,462 B2 * | 7/2013 | Reitz | G06F 21/85 370/252 |
| 2004/0009778 A1 * | 1/2004 | Makuta | H04L 63/107 455/456.1 |

(Continued)

FOREIGN PATENT DOCUMENTS

| | | |
|---|---|---|
| CN | 1692608 A | 11/2005 |
| CN | 101133343 A | 2/2008 |

(Continued)

OTHER PUBLICATIONS

Foreign Communication From A Counterpart Application, European Application No. 12799037.2, Extended European Search Report dated Oct. 28, 2013, 8 pages.

(Continued)

*Primary Examiner* — John Pezzlo
*Assistant Examiner* — Christopher Wyllie
(74) *Attorney, Agent, or Firm* — Conley Rose, P.C.; Grant Rodolph; Nicholas K. Beaulieu

(57) ABSTRACT

The present invention provides a method and system for controlling access of a terminal device to a wireless network. The method includes: receiving, by an access point device, a first wireless network access request message sent by a first terminal device; receiving, by the access point device, feedback information of one or more directional devices within a predetermined area; judging, by the access point device according to the received feedback information, whether N directional devices within the predetermined area all find the first wireless network access request message by monitoring; and if yes, enabling the first terminal device to access the wireless network, where the N is the number of the directional devices within the predetermined area.

5 Claims, 9 Drawing Sheets

(56) References Cited

U.S. PATENT DOCUMENTS

| | | | |
|---|---|---|---|
| 2004/0190718 A1* | 9/2004 | Dacosta | H04L 63/0492 380/247 |
| 2004/0203910 A1* | 10/2004 | Hind | H04W 48/04 455/456.1 |
| 2007/0087763 A1* | 4/2007 | Budampati | H04W 12/06 455/456.5 |
| 2009/0055123 A1 | 2/2009 | Razzell | |
| 2009/0082015 A1 | 3/2009 | Ravi et al. | |
| 2009/0265775 A1* | 10/2009 | Wisely | H04L 63/0492 726/9 |
| 2010/0164720 A1 | 7/2010 | Kore | |
| 2010/0313241 A1 | 12/2010 | Lee et al. | |
| 2013/0316730 A1* | 11/2013 | Ding | H04W 4/02 455/456.1 |
| 2014/0036703 A1* | 2/2014 | Ding | H04W 48/04 370/252 |

FOREIGN PATENT DOCUMENTS

| | | |
|---|---|---|
| CN | 101843146 A | 9/2010 |
| CN | 102202258 A | 9/2011 |
| EP | 1708528 A1 | 10/2006 |
| WO | 2004012424 A2 | 2/2004 |
| WO | 2004059912 A1 | 7/2004 |

OTHER PUBLICATIONS

Foreign Communication From A Counterpart Application, PCT Application PCT/CN2012/079537, Chinese Search Report dated Apr. 4, 2013, 6 pages.

Foreign Communication From A Counterpart Application, PCT Application PCT/CN2012/079537, Chinese Written Opinion dated Apr. 4, 2013, 5 pages.

Foreign Communication From A Counterpart Application, Chinese Application No. 201280002857.6, Chinese Office Action dated May 6, 2015, 9 pages.

\* cited by examiner

METHOD AND SYSTEM FOR CONTROLLING ACCESS OF TERMINAL DEVICE TO WIRELESS NETWORK

CROSS-REFERENCE TO RELATED APPLICATION

This application is a continuation of International Application No. PCT/CN2012/079537, filed on Aug. 1, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention belongs to the field of wireless communications technologies, and in particular, to a method and system for controlling access of a terminal device to a wireless network.

BACKGROUND

With the popularization of the wireless local area network (WLAN), nearly all existing terminal devices have a WLAN access function, and wireless networks are deployed at more and more places.

However, currently most places with a wireless network need input of a password and authentication before use. For example, at places such as a restaurant, a cafe and so on, a user needs to ask a waiter for the password to access the network, for which an operation is complicated and an effect of the user experience is reduced.

An authentication method for a terminal device to access a wireless network is disclosed in the prior art. According to the method, the terminal device initiates, to an access point device (AP), a message carrying signal strength information of the terminal device, and the AP extracts the signal strength information in the message and calculates a signal attenuation value, compares the signal attenuation value obtained by calculation with a preset threshold; if the signal attenuation value is smaller than the preset threshold, the terminal device directly accesses the wireless network without authentication; and otherwise, the access is rejected.

The signal attenuation value obtained by calculation in the prior art is a signal attenuation value in an ideal environment, that is, interference of an obstacle or a wall in an actual environment is not considered, so that the signal attenuation value obtained by calculation is not accurate. In addition, signals transmitted by different terminal devices have different strength, which might result in failure of a terminal device, which is near an AP device but transmits a signal of weak strength, to access the wireless network, whereas a terminal device that is far away from the AP device but transmits a signal of strong strength may access the wireless network, which affects accuracy of authentication judgement.

SUMMARY

An embodiment of the present invention provides a method for controlling access of a terminal device to a wireless network, so as to solve a problem of inaccurate authentication judgement during access of a terminal device to a wireless network in the prior art.

In a first aspect, a method for controlling access of a terminal device to a wireless network includes: receiving, by an access point device, a first wireless network access request message sent by a first terminal device, where the first wireless network access request message is used for requesting access to the wireless network; receiving, by the access point device, feedback information of one or more directional devices within a predetermined area, where the feedback information is used for indicating whether the directional device finds the first wireless network access request message by monitoring; judging, by the access point device, according to the received feedback information, whether N directional devices within the predetermined area all find the first wireless network access request message by monitoring; and if yes, enabling the first terminal device to access the wireless network, where N is the number of directional devices within the predetermined area.

In a first possible implementation manner in the first aspect, the receiving, by the access point device, feedback information of one or more directional devices within a predetermined area includes: receiving, by the access point device, a wireless network access request message sent by each directional device within the predetermined area, where the wireless network access request message is forwarded to the access point device by each directional device when the wireless network access request message is found by monitoring, and the wireless network access request message carries identification information of a terminal that sends the wireless network access request message; and the judging, by the access point device, according to the received feedback information, whether N directional devices within the predetermined area all find the first wireless network access request message by monitoring is specifically: judging, by the access point device, whether a wireless network access request message that is sent by the N directional devices within the predetermined area and carries identification information of the first terminal device is received.

In a second possible implementation manner in the first aspect, before the receiving, by the access point device, feedback information of one or more directional devices within a predetermined area, the method further includes: sending, by the access point device, a query request message to the N directional devices, where the query request message carries identification information of the first terminal device, so that the N directional devices judge, according to the identification information of the first terminal device carried in the query request message, whether the first wireless network access request message sent by the first terminal device to the access point device is found by monitoring, and feed back judgement result information to the access point device; and the receiving, by the access point device, feedback information of one or more directional devices within a predetermined area is specifically: receiving the judgement result information fed back by the N directional devices; and the judging, by the access point device, according to the received feedback information, whether N directional devices within the predetermined area all find the first wireless network access request message by monitoring is specifically: judging, according to the judgement result information, whether the N directional devices all find the first wireless network access request message by monitoring.

In combination with the second possible implementation manner in the first aspect, in a third possible implementation manner, the query request message further carries signature information of the access point device, so that the N directional devices judge whether the access point device is an access point device within the predetermined area according to the signature information carried in the query request message, and when judging that the access point device is the access point device within the predetermined area, send the judgement result information to the access point device.

In combination with the first aspect or the first possible implementation manner in the first aspect or the second possible implementation manner in the first aspect or the third possible implementation manner in the first aspect, in a fourth possible implementation manner, the method further includes: when the access point device judges that at least one directional device does not find, by monitoring, the first wireless network access request message sent by the first terminal device to the access point device, rejecting access of the first terminal device to the wireless network or requiring the first terminal device to send verification information for accessing the wireless network.

In a second aspect, the method for controlling the access of the terminal device to the wireless network includes: monitoring, by a directional device, a first wireless network access request message sent by a first terminal device to an access point device, where the first wireless network access request message is used for requesting access to the wireless network; and sending, by the directional device, feedback information to the access point device, so that the access point device, when judging, according to the feedback information, that N directional devices within a predetermined area all find, by monitoring, the first wireless network access request message sent by the first terminal device, controls the first terminal device to access the wireless network, where the feedback information is used for indicating whether the directional device finds the first wireless network access request message by monitoring.

In a first possible implementation manner in the second aspect, the sending, by the directional device, feedback information to the access point device includes: when the directional device finds the first wireless network access request message by monitoring, reporting the found first wireless network access request message to the access point device, where the message carries identification information of the first terminal device.

In a second possible implementation manner in the second aspect, sending, by the directional device, feedback information to the access point device includes: receiving a query request message carrying the identification information of the first terminal device, where the query request message is sent by the access point device, according to the identification information of the first terminal device carried in the query request message, judging whether the first wireless network access request message sent by the first terminal device to the access point device is found by monitoring, and feeding back judgement result information as the feedback information to the access point device.

In combination with the second possible implementation manner in the second aspect, in a third possible implementation manner, the query request message further carries signature information of the access point device; before the feeding back judgement result information as the feedback information to the access point device, the method further includes: judging, by the directional device, according to the signature information of the access point device, whether the access point device is an access point device within the predetermined area; and the feeding back judgement result information as the feedback information to the access point device is specifically: when the directional device determines, according to the signature information of the access point device, that the access point device is the access point device within the predetermined area, feeding back the judgement result information as the feedback information to the access point device.

In a third aspect, an access point device is disclosed, where the access point device includes: a first receiving unit configured to receive a first wireless network access request message sent by a first terminal device, where the first wireless network access request message is used for requesting access to a wireless network; a second receiving unit configured to receive feedback information of one or more directional devices within a predetermined area, where the feedback information is used for indicating whether the directional device finds the first wireless network access request message by monitoring; and a control unit configured to: according to the feedback information received by the second receiving unit, judge whether N directional devices within the predetermined area all find, by monitoring, the first wireless network access request message received by the first receiving unit; and if yes, enable the first terminal device to access the wireless network, where the N is the number of directional devices within the predetermined area.

In a first possible implementation manner in the third aspect, the second receiving unit is specifically configured to receive a wireless network access request message sent by each directional device within the predetermined area, where the wireless network access request message is forwarded to the access point device by each directional device when the wireless network access request message is found by monitoring, and the wireless network access request message carries identification information of a terminal that sends the wireless network access request message; and the control unit is specifically configured to: according to the wireless network access request message received by the second receiving unit, judge whether a wireless network access request message that is sent by the N directional devices within the predetermined area and carries identification information of the first terminal device is received, and if yes, enable the first terminal device to access the wireless network.

In a second possible implementation manner in the third aspect, the access point device further includes: a querying unit configured to: before the second receiving unit receives the feedback information of the one or more directional device within the predetermined area, send a query request message to the N directional devices, where the query request message carries identification information of the first terminal device, so that the N directional devices judge, according to the identification information of the first terminal device carried in the query request message, whether the first wireless network access request message sent by the first terminal device to the access point device is found by monitoring, and feed back judgement result information to the access point device; and the second receiving unit is specifically configured to receive the judgement result information fed back by the N directional devices; and the control unit is specifically configured to: according to the judgement result information received by the second receiving unit, judge whether the N directional devices all find, by monitoring, the first wireless network access request message received by the first receiving unit, and if yes, enable the first terminal device to access the wireless network.

In combination with the second possible implementation manner in the third aspect, in a third possible implementation manner, the query request message further carries signature information of the access point device, so that the N directional devices judge whether the access point device is an access point device within the predetermined area according to the signature information carried in the query request message, and when judging that the access point device is the access point device within the predetermined area, send the judgement result information to the access point device.

In combination with the third aspect or the first possible implementation manner in the third aspect or the second possible implementation manner in the third aspect or the third possible implementation manner in the third aspect, in a fourth possible implementation manner, the control unit is further configured to: when it is judged that at least one directional device does not find, by monitoring, the first wireless network access request message sent by the first terminal device to the access point device, reject access of the first terminal device to the wireless network or require the first terminal device to send verification information for accessing the wireless network.

In a fourth aspect, an access point device is disclosed, where the access point device includes: a receiver configured to receive a first wireless network access request message sent by a first terminal device, where the first wireless network access request message is used for requesting access to a wireless network; and receive feedback information of one or more directional devices within a predetermined area, where the feedback information is used for indicating whether the directional device finds the first wireless network access request message by monitoring; and a processor configured to: according to the feedback information received by the receiver, judge whether N directional devices within the predetermined area all find, by monitoring, the first wireless network access request message received by the receiver; and if yes, enable the first terminal device to access the wireless network, where the N is the number of directional devices within the predetermined area.

In a first possible implementation manner in the fourth aspect, the receiver is specifically configured to receive a wireless network access request message sent by each directional device within the predetermined area, where the wireless network access request message is forwarded to the access point device by each directional device when the wireless network access request message is found by monitoring, and the wireless network access request message carries identification information of a terminal that sends the wireless network access request message; and the processor is specifically configured to: according to the wireless network access request message received by the second receiving unit, judge whether a wireless network access request message that is sent by the N directional devices within the predetermined area and carries identification information of the first terminal device is received, and if yes, enable the first terminal device to access the wireless network.

In a second possible implementation manner in the fourth aspect, the access point device further includes: a sender configured to: before the receiver receives the feedback information of one or more directional devices within the predetermined area, send a query request message to the N directional devices, where the query request message carries identification information of the first terminal device, so that the N directional devices judge, according to the identification information of the first terminal device carried in the query request message, whether the first wireless network access request message sent by the first terminal device to the access point device is found by monitoring, and feed back judgement result information to the access point device; and the receiver is specifically configured to receive the judgement result information fed back by the N directional devices; and the processor is specifically configured to: according to the judgement result information received by the receiver, judge whether the N directional devices all find, by monitoring, the first wireless network access request message received by the receiver, and if yes, enable the first terminal device to access the wireless network.

In combination with the second possible implementation manner in the fourth aspect, in a third possible implementation manner, the query request message further carries signature information of the access point device, so that the N directional devices judge whether the access point device is an access point device within the predetermined area according to the signature information carried in the query request message, and when judging that the access point device is the access point device within the predetermined area, send the judgement result information to the access point device.

In combination with the fourth aspect or the first possible implementation manner in the fourth aspect or the second possible implementation manner in the fourth aspect or the third possible implementation manner in the fourth aspect, in a fourth possible implementation manner, the processor is further configured to: when it is judged that at least one directional device does not find, by monitoring, the first wireless network access request message sent by the first terminal device to the access point device, reject access of the first terminal device to the wireless network or require the first terminal device to send verification information for accessing the wireless network.

In a fifth aspect, a directional device is disclosed, where the directional device includes: a monitoring unit configured to monitor a first wireless network access request message sent by a first terminal device to an access point device, where the first wireless network access request message is used for requesting access to a wireless network; and a feedback unit configured to send feedback information to the access point device, so that the access point device, when judging, according to the feedback information, that N directional devices within a predetermined area all find, by monitoring, the first wireless network access request message sent by the first terminal device, controls the first terminal device to access the wireless network, where the feedback information is used for indicating whether the directional device finds the first wireless network access request message by monitoring.

In a first possible implementation manner in the fifth aspect, the feedback unit is configured to: when the monitoring unit finds the first wireless network access request message by monitoring, report the found first wireless network access request message to the access point device, where the message carries identification information of the first terminal device.

In a second possible implementation manner in the fifth aspect, the feedback unit is specifically configured to receive a query request message carrying the identification information of the first terminal device, where the query request message is sent by the access point device, according to the identification information of the first terminal device carried in the query request message, judges whether the first wireless network access request message sent by the first terminal device to the access point device is found by monitoring, and feed back judgement result information as the feedback information to the access point device.

In combination with the second possible implementation manner in the fifth aspect, in a third possible implementation manner, the query request message further carries signature information of the access point device; and the feedback unit is specifically configured to: before the feeding back judgement result information as the feedback information to the access point device, according to the signature information of the access point device, judge whether the access point device is an access point device within the predetermined area, and if yes, feed back the judgement result information as the feedback information to the access point device.

In a sixth aspect, a directional device is disclosed, where the directional device includes: a receiver configured to receive a first wireless network access request message sent by a first terminal device to an access point device, where the first wireless network access request message is used for requesting to access a wireless network; and a sender configured to send feedback information to the access point device, so that the access point device, when judging, according to the feedback information, that N directional devices within a predetermined area all receive the first wireless network access request message sent by the first terminal device, controls the first terminal device to access the wireless network, where the feedback information is used for indicating whether the directional device receives the first wireless network access request message.

In a first possible implementation manner in the sixth aspect, the sender is specifically configured to: when the receiver receives the first wireless network access request message, report the received first wireless network access request message to the access point device, where the message carries identification information of the first terminal device.

In a second possible implementation manner in the sixth aspect, the receiver is further configured to receive a query request message carrying the identification information of the first terminal device, where the query request message is sent by the access point device; and the directional device further includes: a processor configured to: according to the identification information of the first terminal device carried in the query request message received by the receiver, judge whether the first wireless network access request message sent by the first terminal device to the access point device is received; and the sender is configured to feed back judgement result information of the processor as the feedback information to the access point device.

In combination with the second possible implementation manner in the sixth aspect, in a third possible implementation manner, the query request message further carries signature information of the access point device; the processor is specifically configured to, before the sender feeds back the judgement result information as the feedback information to the access point device, according to the signature information of the access point device, judge whether the access point device is an access point device within the predetermined area; and the sender is specifically configured to: when the processor determines, according to the signature information of the access point device, that the access point device is the access point device within the predetermined area, feed back the judgement result information as the feedback information to the access point device.

In a seventh aspect, a system for controlling access of a terminal device to a wireless network is disclosed, where the system includes: the access point device and/or the multiple directional devices; where the multiple directional devices are connected to and communicate with the access point device in a wired or wireless manner; and the multiple directional devices are located at different positions within a predetermined area, and each directional device is preset with a monitoring range, so that the multiple directional devices can all monitor a wireless network access request message sent by the terminal device to the access point device within the predetermined area.

It may been seen from the foregoing solutions that, according to the embodiments of the present invention, the directional device within the predetermined area monitors, in real time, the wireless network access request message sent by the terminal device to the access point device, when all directional devices within the predetermined area find, by monitoring, the wireless network access request message sent by the terminal device to the access point device, the access point device enables the terminal device that sends the access request message to access the wireless network directly. Compared with the prior art, according to the embodiments of the present invention, while implementing automatic access of a terminal device to a wireless network within a predetermined area (e.g., an area where a wireless network is deployed, such as a restaurant, a cafe, and so on), calculation of a signal attenuation value is not needed, so that operation steps for the terminal device to access the wireless network are simplified, efficiency for the terminal device to access the wireless network is enhanced, a problem of inaccurate authentication judgement during the access of the terminal device to the wireless network caused by inaccurate calculation of the signal attenuation value in the prior art can be effectively solved, and an effect of user experience is enhanced, contributing to high practicability.

BRIEF DESCRIPTION OF THE DRAWINGS

To illustrate the technical solutions in the embodiments of the present invention more clearly, the following briefly describes accompanying drawings needed for describing the embodiments or the prior art. Obviously, the accompanying drawings in the following description are merely some embodiments of the present invention, and persons of ordinary skill in the art may obtain other drawings from these accompanying drawings without making creative efforts.

DETAILED DESCRIPTION

To make the objectives, technical solutions, and advantages of the present invention more clear, the following describes the present invention in detail with reference to the accompanying drawings and embodiments. It should be understood that the described specific embodiments are only used to explain the present invention, but are not intended to limit the present invention.

To illustrate the technical solutions according to the present invention, illustration is provided below through specific embodiments.

Figure 1:
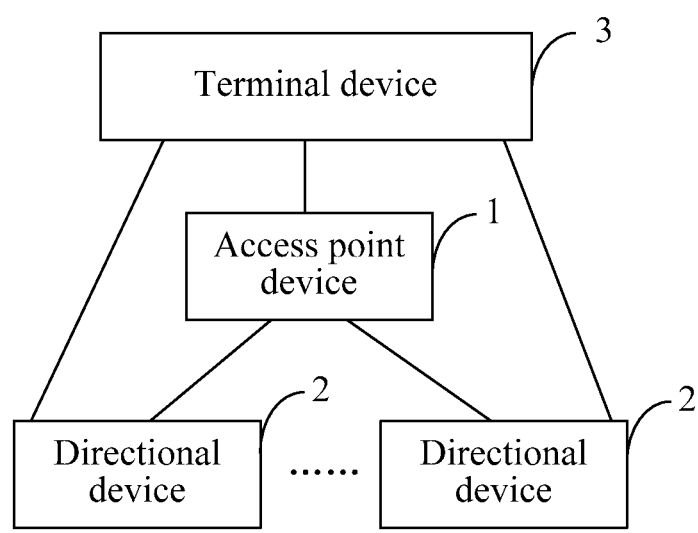
FIG. 1 is a schematic diagram of a scenario of a system for controlling access of a terminal device to a wireless network according to an embodiment of the present invention.

FIG. 1 shows a schematic diagram of a scenario of a system where a method for controlling access of a terminal device to a wireless network according to an embodiment of the present invention is applicable, and for ease of illustration, only the parts involved in the embodiment are shown.

As shown in FIG. 1, the system includes an access point device 1, multiple directional devices 2, and a terminal device 3. The access point device 1 and the multiple directional devices 2 are located at one same channel, the access point device 1 is connected to and communicates with the multiple directional devices 2 in a wired (e.g., a connection of an Ethernet cable, a power cable and so on) or wireless manner, and the terminal device 3 is connected to and communicates with the access point device 1 and the multiple directional devices 2 in a wireless manner.

The access point device 1 may refer to a device that communicates with a wireless terminal via one or more sectors over an air interface in an access network.

The directional device 2 may be a terminal device that has a function of wireless and wired connection.

The terminal device 3 may be any terminal device that has a function of accessing a wireless network, where the terminal device includes, but is not limited to, a mobile phone, a tablet computer, a notebook computer and so on.

To implement automatic access of the terminal device 3 to a wireless network within a predetermined area (e.g., a range where a wireless network is deployed, such as a restaurant, a cafe and so on), in the embodiment of the present invention, the multiple directional devices 2 monitor, in real time, a wireless network access request message sent by the terminal device 3 to the access point device 1, when the multiple directional devices 2 all find, by monitoring, the wireless network access request message sent by the terminal device 3 to the access point device 1, the access point device 1 enables the terminal device 3 that sends the access request message to access the wireless network directly.

In this embodiment, the multiple directional devices 2 are located at different positions within the predetermined area. Each directional device 2 is preset with a monitoring range (e.g., an angle range, a distance range, and the like), where a default distance range (e.g., the maximum length within the predetermined area) is used to ensure monitoring within the predetermined area. The number of directional devices and the monitoring range should meet a principle of maximum coverage of the area, that is, it is made as much as possible such that the multiple directional devices 2 can monitor the wireless network access request message sent by the terminal device 3 to the access point device 1 within the predetermined area, whereas only part of the directional devices 2 can monitor the wireless network access request message sent by the terminal device 3 to the access point device 1 outside the predetermined area.

Figure 2A:
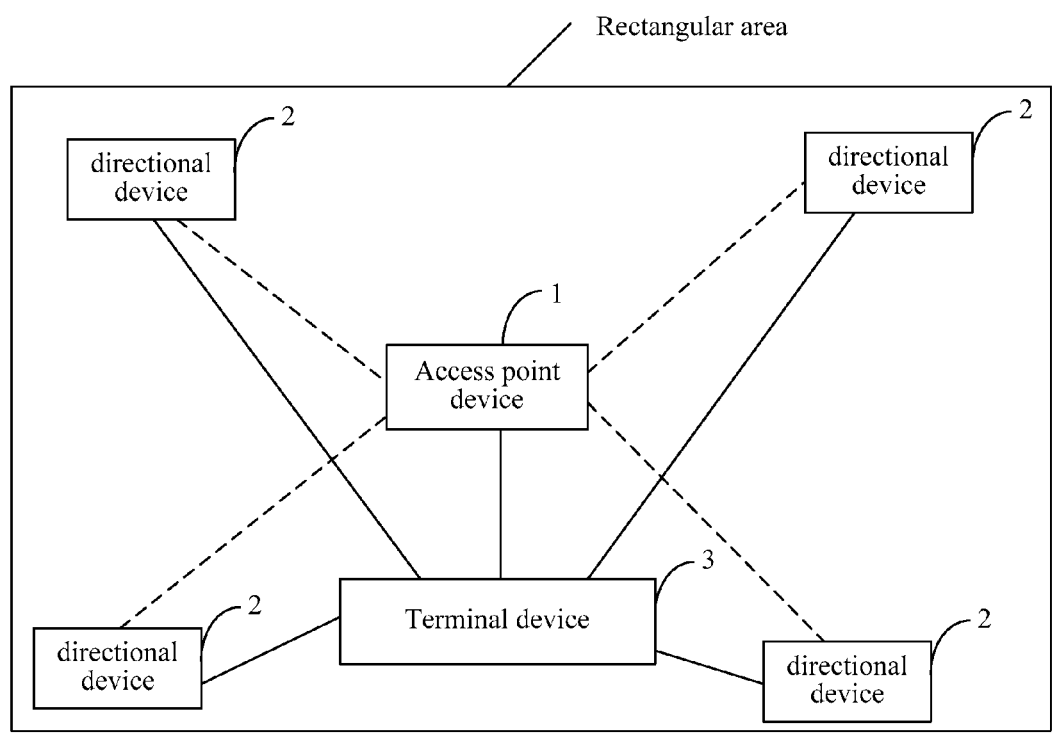
FIG. 2a and FIG. 2b are example diagrams of positioning through a directional device according to an embodiment of the present invention.

FIG. 2a shows one example (not limited here) of positioning through directional devices 2 according to an embodiment of the present invention. As shown in FIG. 2a, the predetermined area is a rectangular area, four directional devices 2 are located at four corners of the rectangular area, and the set monitoring range of each directional device 2 is [0°, 90°] (taking length of the rectangular area as a 0° plane, width of the rectangular area is a 90° plane), so that the directional device 2 can monitor the wireless network access request message sent by the terminal device 3 to the access point device 1 within the rectangular area (the monitoring range of each directional device is smaller than 90 degrees).

Figure 2B:
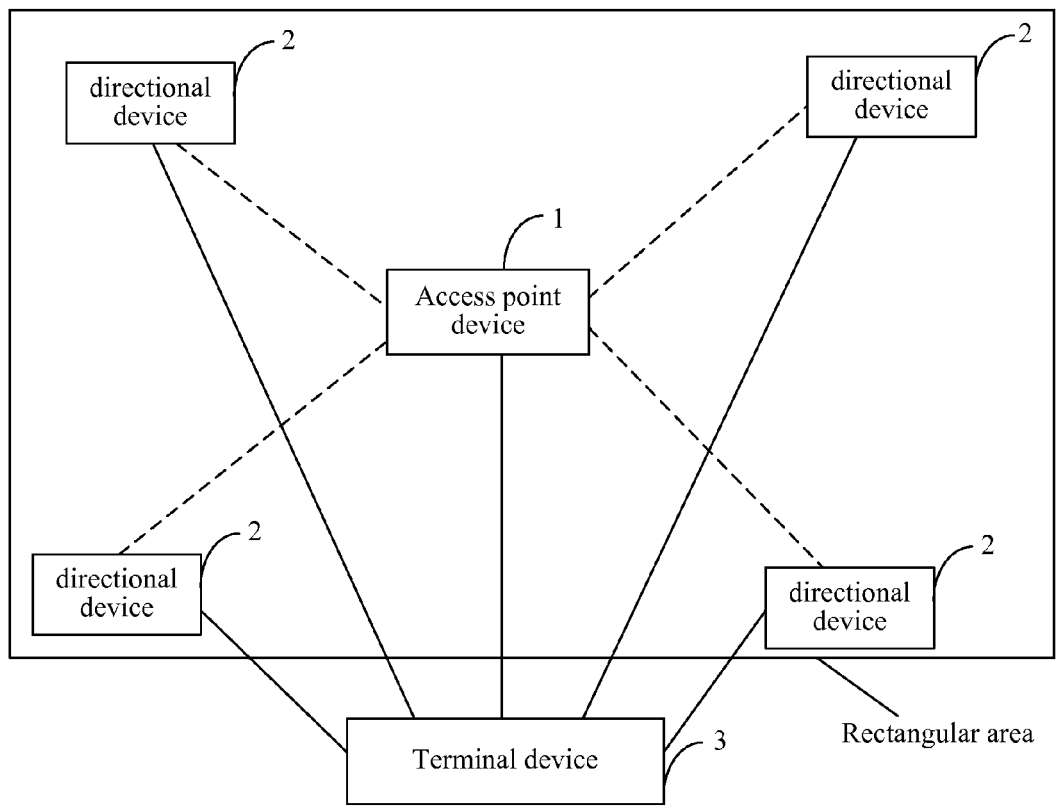

As shown in FIG. 2b, when the terminal device 3 sends a wireless network access request message to the access point device 1 outside the rectangular area, because the set monitoring range of the directional device 2 is [0°, 90°], the directional devices 2 at the lower left corner and at the lower right corner cannot find, by monitoring (the monitoring range is greater than 90 degrees), the wireless network access request message sent by the terminal device 3 to the access point device 1, so that the access point device 1 judges that the terminal device 3 is outside the rectangular area and the terminal device 3 is required to input verification information for accessing the wireless network, for example, an access password and so on.

In addition, when the predetermined area is a hexagonal area, three directional devices may be deployed, a set monitoring range of each directional device is [0°, 120°], and a specific procedure is as described in the foregoing, which is not illustrated here using further examples.

It should be noted that when the predetermined area is an irregular area (e.g., not a regular area such as a rectangle, a hexagon and so on), the directional devices may be deployed according to a principle that the monitoring range of the multiple directional devices has the maximum coverage (the number of the directional devices is smaller than a predetermined value, and a sum of upper limits of the monitoring ranges of the directional devices is greater than or equal to 360°). In this embodiment, a circular area is an irregular area, the directional devices and the monitoring range need to be set by adopting the principle of maximum coverage, for example, three directional devices are deployed, and the set monitoring range of each directional device is [0°, 120°].

The scenario of the system provided in this embodiment is only used to explain the present invention, but does not limit the protection scope of the present invention.

Figure 3:
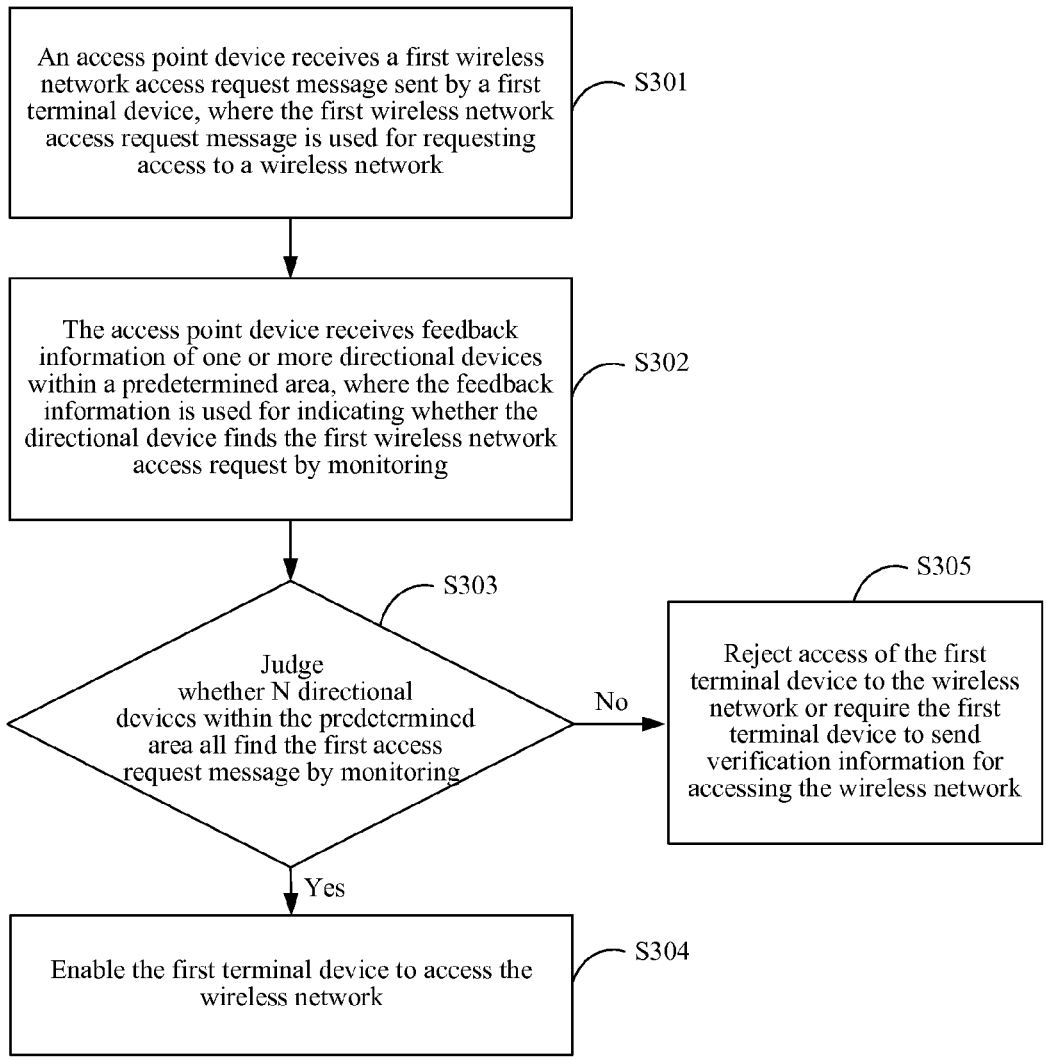
FIG. 3 is a flow chart of implementing a method for controlling access of a terminal device to a wireless network according to another embodiment of the present invention.

FIG. 3 shows a process of implementing a method for controlling access of a terminal device to a wireless network according to another embodiment of the present invention. An execution subject of the embodiment is the access point device 1 in FIG. 1, and a procedure of the method is described in detail in the following:

In step S301, an access point device receives a first wireless network access request message sent by a first terminal device, where the first wireless network access request message is used for requesting access to a wireless network.

It should be noted that, in this specification, the first terminal device refers to a certain terminal device, and the "first" here is only for ease of description and denotation and does not indicate that there is definitely a second terminal device corresponding to it in a specific implementation manner of the present invention. The "first" does not represent an order, either. Similarly, the "first" in the first wireless network access request message is only for ease of description and denotation, and the first wireless network request refers to a wireless network access request sent by the first terminal device. In the specification, the described first wireless network access request message does not indicate that there is definitely a second wireless network access request corresponding to it in a specific implementation manner of the present invention.

In step S302, the access point device receives feedback information of one or more directional devices within a predetermined area, where the feedback information is used for indicating whether the directional device finds the first wireless network access request message by monitoring.

In this embodiment, the receiving, by the access point device, feedback information of one or more directional devices within a predetermined area includes: receiving, by the access point device, a wireless network access request message sent by each directional device within the predetermined area, where the wireless network access request message is forwarded to the access point device by each directional device when the wireless network access request message is found by monitoring, and the wireless network access request message carries identification information of a terminal that sends the wireless network access request message.

In step S303, the access point device judges, according to the received feedback information, whether N directional devices within the predetermined area all find the first wireless network access request message by monitoring, if a judgement result is "yes," execute step S304, and if a judgement result is "no," execute step S305.

In this embodiment, N is the number of directional devices within the predetermined area. The judging, by the access point device, according to the received feedback information, whether N directional devices within the predetermined area all find the first wireless network access request message by monitoring is specifically: judging, by the access point device, whether a wireless network access request message that is sent by the N directional devices within the predetermined area and carries identification information of the first terminal device is received.

In this embodiment, the directional device, when finding the wireless network access request message sent by the terminal device to the access point device by monitoring, reports the monitored wireless network access request message to the access point device, where the reported wireless network access request message carries identification information of the terminal device found by monitoring, the access point device, according to the identification information of the terminal device carried in request messages reported by the N directional devices, judges whether the N directional devices all find, by monitoring, the wireless network access request message sent by the first terminal device to the access point device, if yes, execute step S304, and otherwise, execute step S305.

In step S304, enable the first terminal device to access the wireless network.

In step S305, when the access point device judges that at least one directional device does not find, by monitoring, the first wireless network access request message sent by the first terminal device to the access point device, reject access of the first terminal device to the wireless network or require the first terminal device to send verification information for accessing the wireless network.

Preferably, before the receiving, by the access point device, feedback information of one or more directional devices within a predetermined area, this embodiment further includes: sending, by the access point device, a query request message to the N directional devices, where the query request message carries identification information of the first terminal device, so that the N directional devices judge, according to the identification information of the first terminal device carried in the query request message, whether the first wireless network access request message sent by the first terminal device to the access point device is found by monitoring, and feed back judgement result information to the access point device; the receiving, by the access point device, feedback information of one or more directional devices within a predetermined area is specifically: receiving the judgement result information fed back by the N directional devices; and the judging, by the access point device according to the received feedback information, whether the N directional devices within the predetermined area all find the first wireless network access request message by monitoring is specifically: judging, according to the judgement result information, whether the N directional devices all find the first wireless network access request message by monitoring.

In this embodiment, the directional device, when finding the wireless network access request message sent by the terminal device to the access point device by monitoring, first stores the wireless network access request message found by monitoring or extracts and stores the identification information of the terminal device in the wireless network access request information. After receiving the query request message sent by the access point device, the directional device, according to the identification information of the terminal device carried in the query request message, judges whether the identification information of the terminal device exists in the stored information. If it exists, this indicates that the directional device has found, by monitoring, the wireless network access request message sent by the terminal device, and otherwise, the wireless network access request message is not found by monitoring. The judgement result information is fed back to the access point device, and the access point device judges, according to the judgement result information, whether the N directional devices all find the first wireless network access request message by monitoring.

Preferably, to prevent other devices from forging query information to make a malicious attack to the directional device, the query request message further carries signature information of the access point device, so that the N directional devices judge according to the signature information carried in the query request message, whether the access point device is an access point device within the predetermined area, and when judging that the access point device is the access point device within the predetermined area, send the judgement result information to the access point device.

According to the embodiments of the present invention, the directional device within the predetermined area monitors, in real time, the wireless network access request message sent by the terminal device to an access point device, and when all the directional devices within the predetermined area find, by monitoring, the wireless network access request message sent by the terminal device to the access point device, the access point device enables the terminal device that sends the access request message to access the wireless network directly. Compared with the prior art, according to the embodiment of the present invention, while automatic access of a terminal device to a wireless network within a predetermined area (e.g., an area where a wireless network is deployed, such as a restaurant, a cafe, and so on) is implemented, calculation of a signal attenuation value is not needed, so that operation steps for the terminal device to access the wireless network are simplified, efficiency for the terminal device to access the wireless network is enhanced, a problem of inaccurate authentication judgement during the access of the terminal device to the wireless network caused by inaccurate calculation of the signal attenuation value in the prior art is effectively solved, and an effect of user experience is enhanced, contributing to high practicability.

Figure 4:
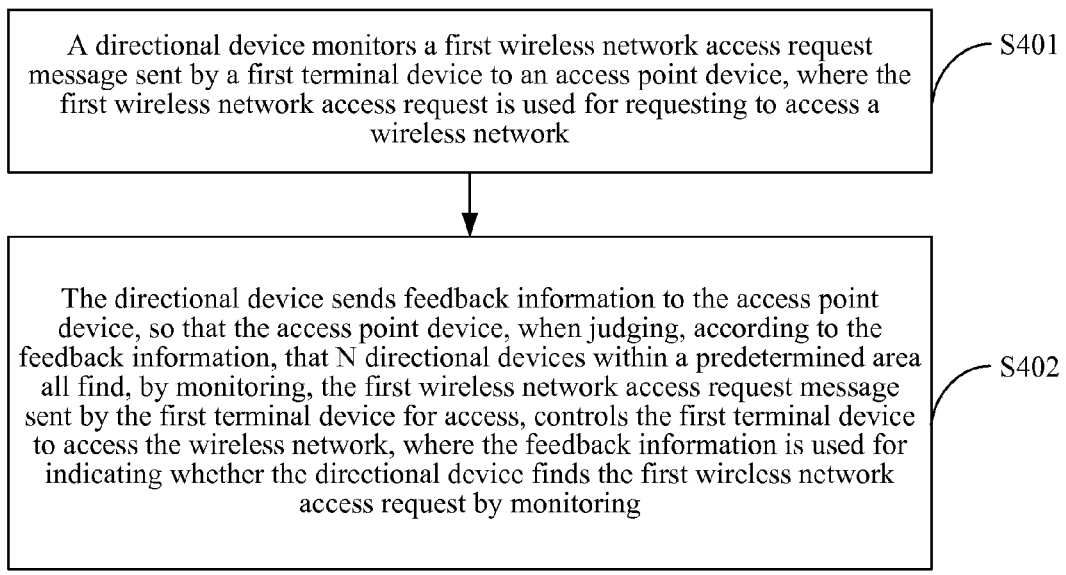
FIG. 4 is a flow chart of implementing a method for controlling access of a terminal device to a wireless network according to another embodiment of the present invention.

FIG. 4 shows a process of implementing a method for controlling access of a terminal device to a wireless network according to another embodiment of the present invention. An execution subject in this embodiment is the directional device 2 in FIG. 1, and a procedure of the method is described in detail in the following:

In step S401, a directional device monitors a first wireless network access request message sent by a first terminal device to an access point device, where the first wireless network access request message is used for requesting access to a wireless network.

In step S402, the directional device sends feedback information to the access point device, so that the access point device, when judging, according to the feedback information, that N directional devices within a predetermined area all find, by monitoring, the first wireless network access request message sent by the first terminal device, controls the first terminal device to access the wireless network, where the feedback information is used for indicating whether the directional device finds the first wireless network access request message by monitoring.

Preferably, sending, by the directional device, feedback information to the access point device includes: when the directional device finds the first wireless network access request message by monitoring, reporting, to the access point device, the first wireless network access request message found by monitoring, where the message carries identification information of the first terminal device; or, receiving a query request message carrying identification information of the first terminal device, where the query request message is sent by the access point device, according to the identification information of the first terminal device carried in the query request message, judging whether the first wireless network access request message sent by the first terminal device to the access point device is found by monitoring, and feeding back judgement result information as the feedback information to the access point device.

Preferably, to prevent other devices from forging query information to make a malicious attack to the directional device, the query request message further carries signature information of the access point device.

Before the feeding back judgement result information as the feedback information to the access point device, the method further includes: judging, by the directional device, according to the signature information of the access point device, whether the access point device is an access point device within the predetermined area; and the feeding back judgement result information as the feedback information to the access point device is specifically: when the directional device determines, according to the signature information of the access point device, that the access point device is an access point device within the predetermined area, feeding back the judgement result information as the feedback information to the access point device.

Figure 5:
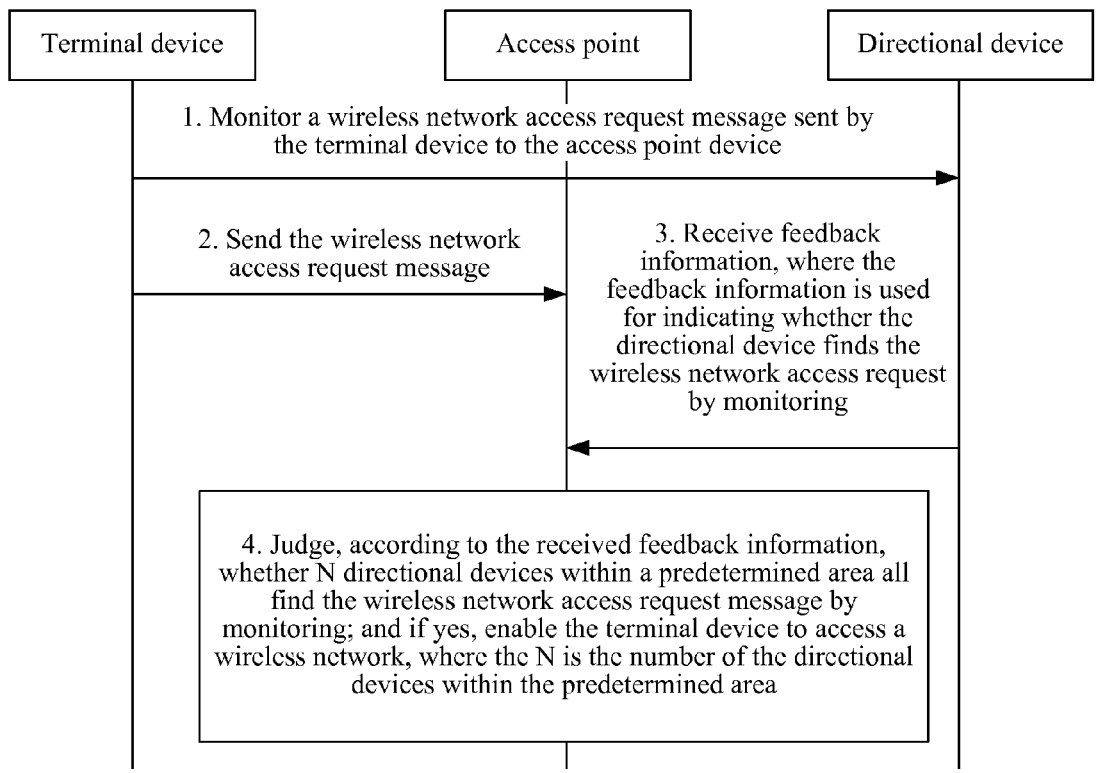
FIG. 5 is a flow chart of interaction in a method for controlling access of a terminal device to a wireless network according to another embodiment of the present invention.

FIG. 5 shows a process of interaction in a method for controlling access of a terminal device to a wireless network according to another embodiment of the present invention, and a procedure of the method is described in detail in the following: 1. A directional device monitors, in real time, a wireless network access request message sent by a terminal device to an access point device.

In this embodiment, multiple directional devices are included, the multiple directional devices are located at different positions within a predetermined area, and each directional device is preset with a monitoring range. The number of the directional devices and the monitoring range of each directional device should meet a principle of maximum coverage, that is, it is made as much as possible that the multiple directional devices can all monitor the wireless network access request message sent by the terminal device to the access point device within the predetermined area, whereas only part of the directional devices can monitor a wireless network access request message sent by the terminal device to the access point device outside the predetermined area. For example, when the predetermined area is a rectangular area, four directional devices are set and located at four corners of the rectangular area, and the set monitoring range of each directional device is set to [0°, 90°].

In this embodiment, the wireless network access request message carries the identification information of the terminal device. When the wireless network access request message sent by the terminal device to the access point device is found by monitoring, the directional device stores the sent wireless network access request message or extracts and stores the identification information of the terminal device in the sent wireless network access request message.

2. The access point device receives the wireless network access request sent by the terminal device.

3. The access point device receives feedback information of the directional device.

In this embodiment, the access point device receives feedback information of one or more directional devices within the predetermined area, where the feedback information is used for indicating whether the directional device finds the first wireless network access request message by monitoring.

4. The access point device judges, according to the received feedback information, whether N directional devices within the predetermined area all find the first wireless network access request message by monitoring; and if yes, enables the first terminal device to access the wireless network, where N is the number of the directional devices within the predetermined area.

Preferably, the receiving, by the access point device, feedback information of one or more directional devices within the predetermined area includes: receiving, by the access point device, a wireless network access request message sent by each directional device within the predetermined area, where the wireless network access request message is forwarded to the access point device by each directional device when the wireless network access request message is found by monitoring, and the wireless network access request message carries identification information of a terminal device that sends the wireless network access request message; and the judging, by the access point device, according to the received feedback information, whether N directional devices within the predetermined area all find the first wireless network access request message by monitoring is specifically: judging, by the access point device, whether a wireless network access request message that is sent by the N directional devices within the predetermined area and carries identification information of the first terminal device is received.

Further preferably, before the receiving, by the access point device, feedback information of one or more directional devices within the predetermined area, the method further includes: sending, by the access point device, a query request message to the N directional devices, where the query request message carries identification information of the first terminal device, so that the N directional devices judge, according to the identification information of the first terminal device carried in the query request message, whether the first wireless network access request message sent by the first terminal device to the access point device is found by monitoring, and feed back judgement result information to the access point device; the receiving, by the access point device, feedback information of one or more directional devices within the predetermined area is specifically: receiving the judgement result information fed back by the N directional devices; and the judging, by the access point device, according to the received feedback information, whether the N directional devices within the predetermined area all find the first wireless network access request message by monitoring is specifically: judging, according to the judgement result information, whether the N directional devices all find the first wireless network access request message by monitoring.

The identification information of the terminal device may be a physical address and the like of the terminal device. The query information may further carry the type of a query message, an abstract of the query message and so on, and may further carry the request message of the terminal device in the query information as a copy, so that the directional device judges, according to the information carried in the query information, whether the wireless network access request message sent by the terminal device to the access point device exists in the monitored information.

Preferably, to prevent other devices from forging query information to make a malicious attack to the directional device, the query request message further carries signature information of the access point device, so that the N directional devices judge, according to the signature information carried in the query request message, whether the access point device is an access point device within the predetermined area, and when judging that the access point device is the access point device within the predetermined area, send the judgement result information to the access point device.

Preferably, this embodiment further includes: when the access point device judges that at least one directional device does not find, by monitoring, the first wireless network access request message sent by the first terminal device to the access point device, rejecting access of the first terminal device to the wireless network or requiring the first terminal device to send verification information for accessing the wireless network, for example, information such as an access password and so on.

In this embodiment, when information fed back by all the directional devices is that the wireless network access request message is found by monitoring, it indicates that the terminal device that sends the access request message is located within the predetermined area and input of the password is not needed, and the terminal device is directly enabled to access the wireless network. Otherwise, it indicates that the terminal device is located outside the predetermined area, and the terminal device needs to input the password before accessing the wireless network.

It should be noted that in this embodiment the access point device communicates with the directional device in an encrypted manner.

Compared with the prior art, according to the embodiment of the present invention, while automatic access of a terminal device to a wireless network within a specific area (e.g., a range where a wireless network is deployed, such as a restaurant, a cafe and so on) is implemented, calculation of a signal attenuation value is not needed, so that a problem of inaccurate authentication judgement during access of the terminal device to the wireless network caused by inaccurate calculation of the signal attenuation value in the prior art may be effectively solved, operation steps for the terminal device to access the wireless network are simplified, and efficiency for the terminal device to access the wireless network and an effect of user experience are enhanced.

Figure 6:
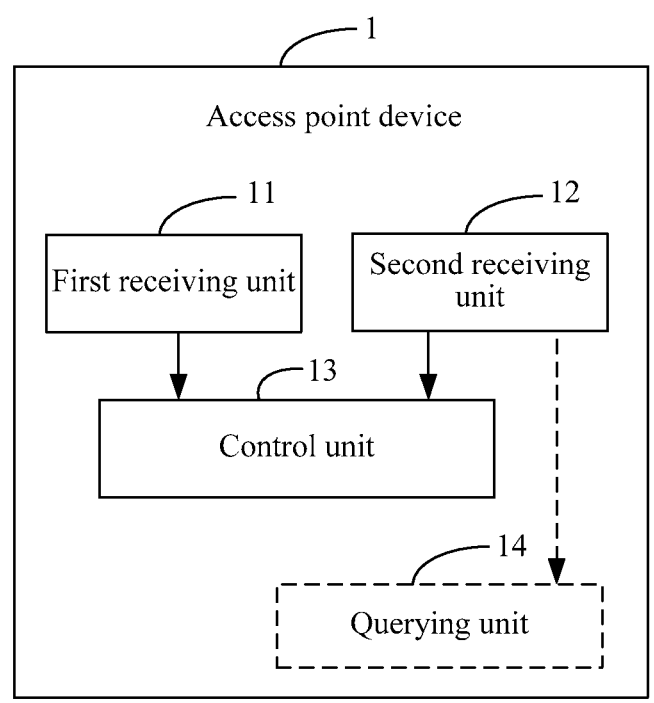
FIG. 6 is a constitutional structural diagram of an access point device according to another embodiment of the present invention.

FIG. 6 shows a constitutional structure of an access point device according to another embodiment of the present invention. For ease of illustration, only the parts involved in the embodiment of the present invention are shown.

The access point device 1 includes: a first receiving unit 11 configured to receive a first wireless network access request message sent by a first terminal device, where the first wireless network access request message is used for requesting access to a wireless network; a second receiving unit 12 configured to receive feedback information of one or more directional devices within a predetermined area, where the feedback information is used for indicating whether the directional device finds the first wireless network access request message by monitoring; and a control unit 13 configured to: according to the feedback information received by the second receiving unit 12 judge whether N directional devices within the predetermined area all find, by monitoring, the first wireless network access request message received by the first receiving unit 11; and if yes, enable the first terminal device to access the wireless network, where N is the number of the directional devices within the predetermined area.

Further, the second receiving unit 12 is specifically configured to receive a wireless network access request message sent by each directional device within the predetermined area, where the wireless network access request message is forwarded to the access point device by each directional device when the wireless network access request message is found by monitoring, and the wireless network access request message carries identification information of a terminal that sends the wireless network access request message; and the control unit 13 is specifically configured to: according to the wireless network access request message received by the second receiving unit 12, judge whether the wireless network access request message that is sent by the N directional devices within the predetermined area and carries identification information of the first terminal device is received, and if yes, enable the first terminal device to access the wireless network.

Further, the access point device 1 further includes: a querying unit 14 configured to: before the second receiving unit 12 receives the feedback information of the one or more directional devices within the predetermined area, send a query request message to the N directional devices, where the query request message carries the identification information of the first terminal device, so that the N directional devices judge, according to the identification information of the first terminal device carried in the query request message, whether the first wireless network access request message sent by the first terminal device to the access point device is found by monitoring, and feed back judgement result information to the access point device; where the second receiving unit 12 is specifically configured to receive the judgement result information fed back by the N directional devices; and the control unit 13 is specifically configured to: according to the judgement result information received by the second receiving unit, judge whether the N directional devices all find, by monitoring, the first wireless network access request message received by the first receiving unit, and if yes, enable the first terminal device to access the wireless network.

Further, the query request message further carries signature information of the access point device, so that the N directional devices judge, according to the signature information carried in the query request message, whether the access point device is an access point device within the predetermined area, and when judging that the access point device is the access point device within the predetermined area, send the judgement result information to the access point device.

Further, the control unit 13 is further configured to: when it is judged that at least one directional device does not find, by monitoring, the first wireless network access request message sent by the first terminal device to the access point device, reject access of the first terminal device to the wireless network or require the first terminal device to send verification information for accessing the wireless network.

The access point device provided in this embodiment may use the corresponding method for controlling access of the terminal device to the wireless network in the foregoing, and reference may be made to the related description of the corresponding embodiments of the method for controlling the access of the terminal device to the wireless network in FIG. 3 and FIG. 5 for details, which are not repeatedly described here.

Persons of ordinary skill in the art may understand that the various units included in the embodiment of the access point device are only divided according to logical functions, but is not limited to the foregoing division, as long as the corresponding functions can be implemented. In addition, the specific names of the functional units are only for ease of distinguishing rather than to limit the protection scope of the present application.

Figure 7:
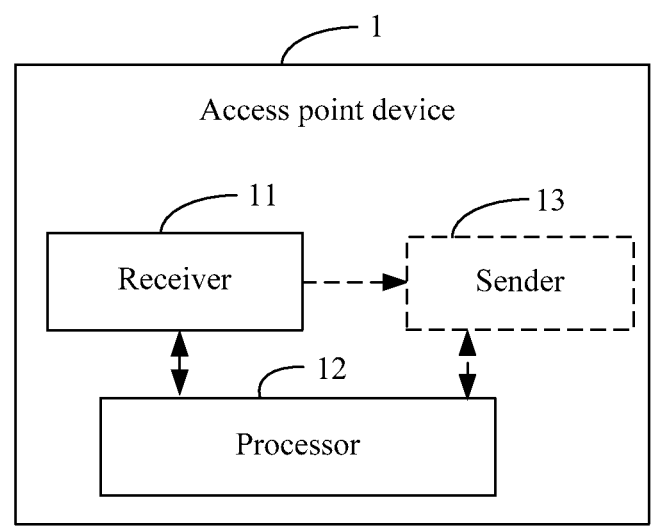
FIG. 7 is a constitutional structural diagram of an access point device according to another embodiment of the present invention.

FIG. 7 shows a constitutional structure of an access point device according to another embodiment of the present invention. The access point device provided in the embodiment of the present invention may be configured to implement the methods in the embodiments corresponding to FIG. 3 and FIG. 5. For ease of illustration, only the parts involved in the embodiment of the present invention are shown, and reference may be made to the embodiments corresponding to FIG. 3 and FIG. 5 for specific technical details that are not shown.

The access point device 1 includes: a receiver 11 configured to receive a first wireless network access request message sent by a first terminal device, where the first wireless network access request message is used for requesting to access a wireless network; and receive feedback information of one or more directional devices within a predetermined area, where the feedback information is used for indicating whether the directional device finds the first wireless network access request message by monitoring; and a processor 12 configured to: according to the feedback information received by the receiver 11, judge whether N directional devices within the predetermined area all find, by monitoring, the first wireless network access request message received by the receiver; and if yes, enable the first terminal device to access the wireless network, where the N is the number of the directional devices within the predetermined area.

Further, the receiver 11 is specifically configured to receive a wireless network access request message sent by each directional device within the predetermined area, where the wireless network access request message is forwarded to the access point device by each directional device when the wireless network access request message is found by monitoring, and the wireless network access request message carries identification information of a terminal that sends the wireless network access request message.

Specifically, the processor 12 is configured to: according to the wireless network access request message received by the receiver 11, judge whether the wireless network access request message that is sent by the N directional devices within the predetermined area and carries identification information of the first terminal device is received, and if yes, enable the first terminal device to access the wireless network.

Further, the access point device 1 further includes: a sender 13, before the receiver 11 receives the feedback information of the one or more directional devices within the predetermined area, send a query request message to the N directional devices, where the query request message carries the identification information of the first terminal device, so that the N directional devices judge, according to the identification information of the first terminal device carried in the query request message, whether the first wireless network access request message sent by the first terminal device to the access point device is found by monitoring, and feed back judgement result information to the access point device; where the receiver 11 is specifically configured to receive the judgement result information fed back by the N directional devices; and the processor 12 is specifically configured to: according to the judgement result information received by the receiver, determine whether the N directional devices all find, by monitoring, the first wireless network access request message received by the receiver, and if yes, enable the first terminal device to access the wireless network.

Further, the query request message further carries signature information of the access point device, so that the N directional devices judge, according to the signature information carried in the query request message, whether the access point device is an access point device within the predetermined area, and when judging that the access point device is the access point device within the predetermined area, send the judgement result information to the access point device.

Further, the processor 12 is further configured to: when it is judged that at least one directional device does not find, by monitoring, the first wireless network access request message sent by the first terminal device to the access point device, reject access of the first terminal device to the wireless network or require the first terminal device to send verification information for accessing the wireless network.

The processor 12 is a control center of the access point device, uses various interfaces and lines to connect each part of the entire access point device, and according to the information which is fed back by the directional device and is received by the receiver 11, determines whether to enable the terminal device that sends the wireless access request information to access the wireless network. Optionally, the processor 12 may include one or more processing units and may also integrate an application processor and a modulation/demodulation processor, where the application processor mainly processes an operating system, a user interface, an application program and so on, and the modulation/demodulation processor mainly processes wireless communication. The wireless communication may use any communication standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), and so on. It may be understood that the foregoing modulation/demodulation processor may also not be integrated in the processor 12.

Persons skilled in the art may understand that the constitutional structure shown in FIG. 7 does not construct a limit to the access point device, more or fewer components than those shown in the figure may be included, or some certain components are combined, or components are arranged in a different way.

Figure 8:
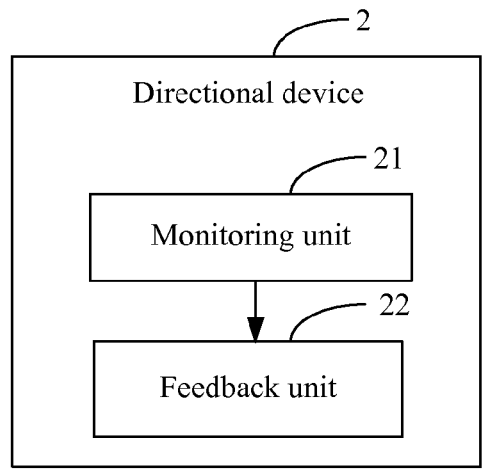
FIG. 8 is a constitutional structural diagram of a directional device according to another embodiment of the present invention.

FIG. 8 shows a constitutional structure of a directional device according to another embodiment of the present invention, and for ease of illustration, only the parts involved in the embodiment of the present invention are shown.

The directional device 2 includes: a monitoring unit 21 configured to monitor a first wireless network access request message sent by a first terminal device to an access point device, where the first wireless network access request message is used for requesting to access a wireless network; and a feedback unit 22 configured to send feedback information to the access point device, so that the access point device, when judging, according to the feedback information, that N directional devices within a predetermined area all find, by monitoring, the first wireless network access request message sent by the first terminal device, controls the first terminal device to access the wireless network, where the feedback information is used for indicating whether the directional device finds the first wireless network access request message by monitoring.

Further, the feedback unit 22 is configured to: when the monitoring unit finds the first wireless network access request message by monitoring, report, to the access point device, the first wireless network access request message found by monitoring, where the message carries identification information of the first terminal device.

Further, the feedback unit 22 is specifically configured to receive a query request message that carries the identification information of the first terminal device and is sent by the access point device, according to the identification information of the first terminal device carried in the query request message, judge whether the first wireless network access request message sent by the first terminal device to the access point device is found by monitoring, and feed back judgement result information as the feedback information to the access point device.

Preferably, the query request message further carries signature information of the access point device.

The feedback unit 22 is specifically configured to, before the feeding back judgement result information as the feedback information to the access point device, according to the signature information of the access point device, judge whether the access point device is an access point device within the predetermined area, if yes, feed back the judgement result information as the feedback information to the access point device. The directional device provided in this embodiment may use the corresponding method for controlling access of the terminal device to the wireless network in the foregoing, and reference may be made to the related description of the corresponding embodiments of the methods for controlling access of the terminal device to the wireless network in FIG. 4 and FIG. 5 for details, which are not repeatedly described here.

Persons of ordinary skill in the art may understand that the various units included in the embodiment of the directional device are only divided according to logical functions, but is not limited to the foregoing division, as long as the corresponding functions may be implemented. In addition, the specific names of the functional units are only for ease of distinguishing rather than to limit the protection scope of the present application.

Figure 9:
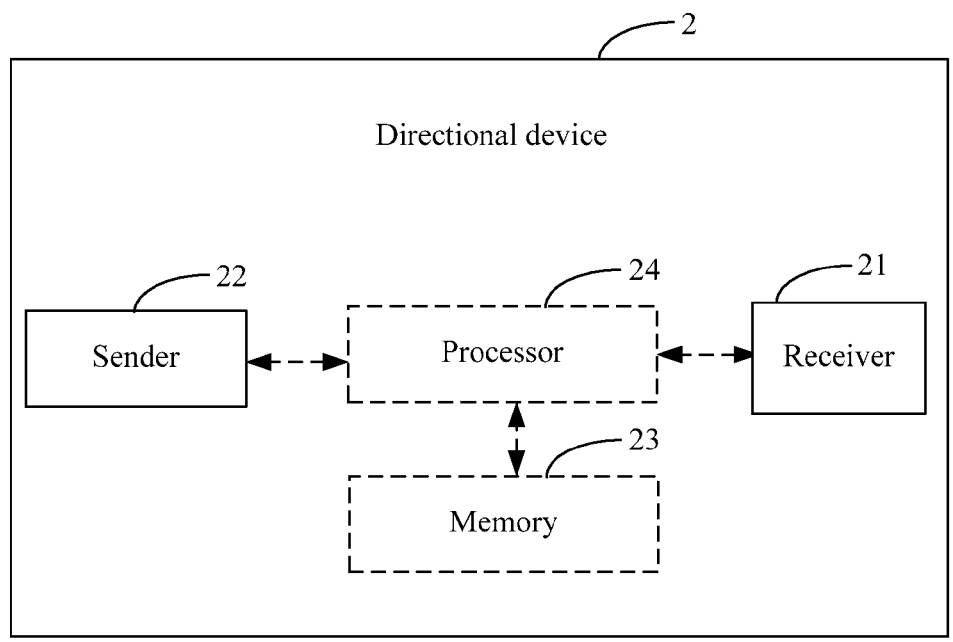
FIG. 9 is a constitutional structural diagram of a directional device according to another embodiment of the present invention.

FIG. 9 shows a constitutional structure of a directional device according to another embodiment of the present invention. The directional device provided in the embodiment of the present invention may be configured to implement the methods in the corresponding embodiments in FIG. 4 and FIG. 5. For ease of illustration, only the parts involved in the embodiment of the present invention are shown, and reference may be made to the corresponding embodiments in FIG. 4 and FIG. 5 for specific technical details that are not shown.

The directional device 2 includes: a receiver 21 configured to receive a first wireless network access request message sent by a first terminal device to an access point device, where the first wireless network access request message is used for requesting to access a wireless network; and a sender 22 configured to send feedback information to the access point device, so that the access point device, when judging, according to the feedback information, that N directional devices within a predetermined area all receive the first wireless network access request message sent by the first terminal device, controls the first terminal device to access the wireless network, where the feedback information is used for indicating whether the directional device receives the first wireless network access request message.

It should be noted that persons skilled in the art may understand that the directional device 2 may further include a memory 23 and a processor 24. The processor 24 operates a software program and a module which are stored in the memory 23, so as to execute various functional applications and data processing of the directional device 2. The processor 24 is connected to the receiver 21, the sender 22, and the memory 23, respectively.

Further, the sender 22 is specifically configured to: when the receiver 21 receives the first wireless network access request message, report the received first wireless network access request message to the access point device, where the message carries identification information of the first terminal device.

Further, the receiver 21 is configured to receive a query request message that carries the identification information of the first terminal device and is sent by the access point device.

The directional device 2 further includes: the processor 24 configured to: according to the identification information of the first terminal device carried in the query request message received by the receiver 21, judge whether the first wireless network access request message sent by the first terminal device to the access point device is received; and the sender 22 configured to feed back judgement result information of the processor 24 as the feedback information to the access point device.

Further, the query request message further carries signature information of the access point device.

The processor 24 is specifically configured to, before the sender 22 feeds back the judgement result information as the feedback information to the access point device, according to the signature information of the access point device, judge whether the access point device is an access point device within the predetermined area.

The sender 22 is specifically configured to: when the processor determines that the access point device is the access point device within the predetermined area according to the signature information of the access point device, feed back the judgement result information as the feedback information to the access point device.

Persons skilled in the art may understand that the constitutional structure shown in FIG. 9 does not construct a limit to the directional device, and more or fewer components than those shown in the figure may be included, or some certain components are combined, or components are arranged in a different way.

In conclusion, according to the embodiments of the present invention, multiple directional devices monitor, in real time, the wireless network access request message sent by the terminal device to the access point device, when the multiple directional devices all find, by monitoring, the wireless network access request message sent by the terminal device to the access point device, the access point device enables the terminal device that sends the access request message to access the wireless network directly, and otherwise rejects access of the terminal device, which sends the access request message, to the wireless network or requires the terminal device, which sends the access request message, to send verification information for accessing the wireless network. Compared with the prior art, according to the embodiment of the present invention, while automatic access of a terminal device to a wireless network within a specific area (e.g., a range where a wireless network is deployed, such as a restaurant, a cafe and so on) is implemented, calculation of a signal attenuation value is not needed, so that the problem of inaccurate authentication judgement during access of the terminal device to the wireless network caused by inaccurate calculation of the signal attenuation value in the prior art may be effectively solved, operation steps for the terminal device to access the wireless network are simplified, the efficiency for the terminal device to access the wireless network and the effect of the user experience are enhanced, contributing to high practicability. Also, by carrying the signature information of the access point device in the query information, it may be effectively prevented that other devices forge query information to make a malicious attack to the directional device.

All of or part of the steps in the method for controlling the access of the terminal device to the wireless network provided in the embodiments of the present invention may be implemented by a program instructing relevant hardware, for example, may be implemented by a computer running program. The programs may be stored in a readable storage medium such as a random access memory, a magnetic disk, a compact disk and so on.

The foregoing embodiments are merely used for describing the technical solutions of the present invention other than limiting the present invention. Although the present invention is described in detail with reference to the foregoing embodiments, persons of ordinary skill in the art should understand that they may still make modifications to the technical solutions recorded in the foregoing embodiments, or make equivalent substitutions to part of the technical features, while such modifications or substitutions do not make the nature of corresponding technical solutions depart from the spirit and scope of the technical solutions of the embodiments of the present application.

What is claimed is:

1. A method for controlling access of a terminal device to a wireless network comprising:
    receiving, by an access point device, a first wireless network access request message sent by a first terminal device, wherein the first wireless network access request message is configured to request access to the wireless network;
    receiving, by the access point device, feedback information of one or more directional devices within a predetermined area, wherein the feedback information indicates whether the one or more directional devices find the first wireless network access request message;
    judging, by the access point device, according to the received feedback information, whether N directional devices within the predetermined area find the first wireless network access request message, wherein N is the number of directional devices within the predetermined area, and wherein the N directional devices monitor to find the first wireless network access request message, and wherein N is an integer greater or equal to two; and
    enabling the first terminal device to access the wireless network when each of the N directional devices finds the first wireless network access request message,
    wherein each of the N directional devices is capable of finding the first wireless network access request message sent by the first terminal device when the first terminal device is located within the predetermined area,
    wherein before the receiving, by the access point device, feedback information of the one or more directional devices within the predetermined area, the method further comprises sending, by the access point device, a query request message to the N directional devices,
    wherein the query request message carries identification information of the first terminal device such that the N directional devices judge according to the identification information of the first terminal device carried in the query request message, whether the first wireless network access request message sent by the first terminal device to the access point device is found by monitoring and feedback judgment result information to the access point device,
    wherein the receiving, by the access point device, feedback information of the one or more directional devices within the predetermined area comprises receiving the judgment result information fed back by the N directional devices,
    wherein the judging, by the access point device, according to the received feedback information, whether the N directional devices within the predetermined area find the first wireless network access request message comprises judging, according to the judgment result information, whether each of the N directional devices finds the first wireless network access request message,
    wherein the query request message carries signature information of the access point device such that the N directional devices judge, according to the signature information carried in the query request message, whether the access point device is an access point device within the predetermined area, and
    wherein the N directional devices send the judgment result information to the access point device when the N directional devices judge that the access point device is within the predetermined area.

2. The method according to claim 1, further comprising rejecting access of the first terminal device to the wireless network or requiring the first terminal device to send verification information for accessing the wireless network when the access point judges that at least one directional device does not find the first wireless network access request message sent by the first terminal device to the access point device.

3. A method for controlling access of a terminal device to a wireless network comprising:
    monitoring, by a directional device, a first wireless network access request message sent by a first terminal device to an access point device, wherein the first wireless network access request message is configured to request access to the wireless network; and
    sending, by the directional device, feedback information to the access point device, wherein the feedback information indicates whether the directional device finds the first wireless network access request message, and wherein the feedback information enables the access point device to control access of the first terminal device to the wireless network by judging, according to the feedback information, that N directional devices within a predetermined area find the first wireless network access request message sent by the first terminal device, wherein the N directional devices monitor to find the first wireless network access request message, and wherein N is an integer greater or equal to two,
    wherein each of the N directional devices is capable of finding the first wireless network access request message sent by the first terminal device when the first terminal device is located within the predetermined area,
    wherein sending, by the directional device, the feedback information to the access point device comprises:

receiving a query request message that carries identification information of the first terminal device and that is sent by the access point device;

judging, according to the identification information of the first terminal device carried in the query request message, whether the first wireless network access request message sent by the first terminal device to the access point device is found; and feeding back judgment result information as the feedback information to the access point device, wherein the query request message carries signature information of the access point device, wherein the method further comprises judging, by the directional device, according to the signature information of the access point device, whether the access point device is an access point device within the predetermined area before feeding back the judgment result information as the feedback information to the access point device, and wherein feeding back the judgment result information as the feedback information to the access point device comprises feeding back the judgment result information as the feedback information to the access point device when the directional device determines, according to the signature information of the access point device, that the access point device is the access point device within the predetermined area.

4. An access point device, comprising a receiver, a storage, and a processor, the processor being configured to process data through executing a software program in the storage to perform the following:

receiving a first wireless network access request message sent by a first terminal device through the receiver, wherein the first wireless network access request message is configured to request access to the wireless network;

receiving feedback information of one or more directional devices within a predetermined area through the receiver, wherein the feedback information indicates whether the one or more directional devices find the first wireless network access request message;

judging, according to the received feedback information, whether N directional devices within the predetermined area find the first wireless network access request message, wherein N is the number of directional devices within the predetermined area, and wherein the N directional devices monitor to find the first wireless network access request message, and wherein N is an integer greater or equal to two; and enabling the first terminal device to access the wireless network when each of the N directional devices finds the first wireless network access request message, wherein each of the N directional devices is capable of finding the first wireless network access request message sent by the first terminal device when the first terminal device is located within the predetermined area, wherein before the receiving feedback information of the one or more directional devices within the predetermined area, the processor further performs the following sending a query request message to the N directional devices, wherein the query request message carries identification information of the first terminal device such that the N directional devices judge, according to the identification information of the first terminal device carried in the query request message, whether the first wireless network access request message sent by the first terminal device to the access point device is found by monitoring and feedback judgment result information to the access point device, wherein the receiving feedback information of the one or more directional devices within the predetermined area comprises receiving the judgment result information fed back by the N directional devices, wherein the judging, according to the received feedback information, whether the N directional devices within the predetermined area find the first wireless network access request message comprises judging, according to the judgment result information, whether each of the N directional devices finds the first wireless network access request message, wherein the query request message carries signature information of the access point device such that the N directional devices judge, according to the signature information carried in the query request message, whether the access point device is an access point device within the predetermined area, and wherein the N directional devices send the judgment result information to the access point device when the N directional devices judge that the access point device is within the predetermined area.

5. The access point device of claim 4, wherein the processor further performs the following:

rejecting access of the first terminal device to the wireless network or requiring the first terminal device to send verification information for accessing the wireless network when the access point judges that at least one directional device does not find the first wireless network access request message sent by the first terminal device to the access point device.

* * * * *